(No Model.)

H. P. FOWLER.
FRAME FOR VELOCIPEDES.

No. 562,074. Patented June 16, 1896.

Witnesses:
Chas. Epworth
F. M. Eggleston

Inventor:
Harry P. Fowler
by Redding & Kiddle
Attys.

UNITED STATES PATENT OFFICE.

HARRY P. FOWLER, OF HARTFORD, CONNECTICUT, ASSIGNOR TO THE POPE MANUFACTURING COMPANY, OF SAME PLACE AND PORTLAND, MAINE.

FRAME FOR VELOCIPEDES.

SPECIFICATION forming part of Letters Patent No. 562,074, dated June 16, 1896.

Application filed November 7, 1895. Serial No. 568,162. (No model.)

*To all whom it may concern:*

Be it known that I, HARRY P. FOWLER, a citizen of the United States, and a resident of the city and county of Hartford, State of Connecticut, have invented certain new and useful Improvements in Frames for Velocipedes, &c., of which the following is a specification, reference being had to the accompanying drawings, forming part hereof.

This invention has relation to the construction of frames, such as the frames of velocipedes, in which one part or member is required to be joined at its extremity to another tubular part or member which is disposed substantially in a transverse direction with respect to the first-named part or member.

The object of the invention is to provide improved means for joining one such part or member to the other, whereby the joint shall have the requisite strength and at the same time shall be as neat, compact, and light as it is possible to make such joints with the use of dropped forgings, while materially reducing the cost of construction.

The improved construction will be particularly described and explained hereinafter with reference to the accompanying drawings, in which—

Figure 1:
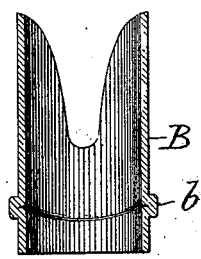
Figure 2:
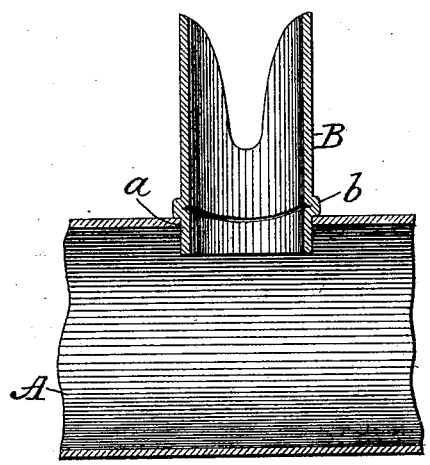
Figure 3:
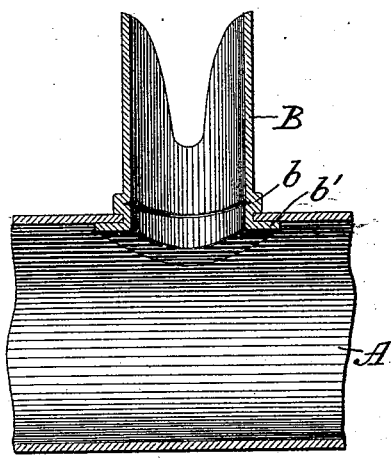
Figure 4:
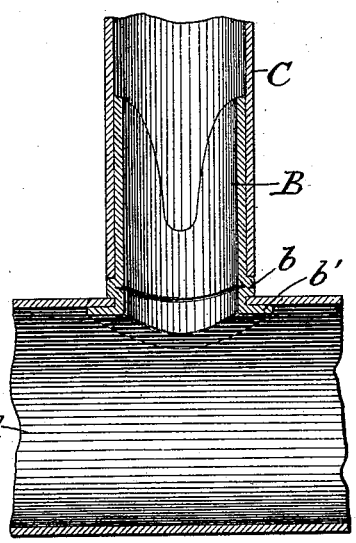

Figure 1 is a longitudinal section of a reinforcement or socket piece constructed in accordance with my invention and in readiness for application to the tubular part or member of the frame. Fig. 2 is a similar view showing also the tubular part or member to which the reinforcement or socket piece is applied. Fig. 3 is a view similar to Fig. 2, but showing a further step in the method of securing the parts together. Fig. 4 is a view similar to Fig. 3, but showing also a portion of the part or member of the frame which is to be secured to the tubular part or member.

In the drawings the tube A represents a portion of a crank-shaft bracket of a bicycle, for example, or any other tubular part or member of the frame. It has formed therein at a suitable point a hole $a$ of such shape and size as to receive snugly one extremity of the reinforcement or socket piece B, which is of a form and character adapted to the particular use in view. Preferably the reinforcement-piece or socket B is a short length of tubing, and it is formed or provided with a shoulder $b$, which conforms to the surface of the tube A, so as to fit snugly against the same. It will be obvious that the form of the shoulder will be varied, not only according to the relative sizes of the member A and of the reinforcement or socket piece B, but also according to the relative disposition of the socket-piece with respect to the member A, it being possible to dispose the two parts not only at right angles to one another, as represented, but at any other desired angle within reasonable limits. After the reinforcement or socket piece B has been applied to the member A, as represented in Fig. 2, its inwardly-projecting end is upset or crimped upon the inside of the member A to form an outwardly-projecting flange $b'$, as clearly represented in Figs. 3 and 4.

That part or member of the frame which it is desired to secure at its extremity to the tubular part or member A may now be applied to the socket-piece B. Frames of the general class to which I have referred are usually composed of tubing, and the second part or member of the frame, as represented at C in Fig. 4, is therefore preferably slipped upon the outside of the reinforcement or socket piece B, and the end of such tube is formed to fit against the shoulder $b$ of the reinforcement or socket piece B, thereby making a smooth joint. It will be obvious, however, that the part or member C, whether tubular or solid, might be slipped within the reinforcement or socket piece B. In any case, when the several parts are assembled, they are securely united together by brazing or other similar means.

It will be understood that the term "socket-piece" is employed herein with reference to the part B, whether such part receives the member C upon or within itself, both arrangements being clearly within the scope of my invention. It is also to be understood that the part C of the frame may be either tubular or solid, although for ordinary purposes I prefer that it shall be tubular and that the parts be assembled as represented.

I claim as my invention—

In a frame for velocipedes or other like purposes, the combination with two tubular parts or members to be secured together, the first part or member having a hole formed in its wall and the second part or member being adapted to be secured at its extremity to the first-named part or member in line with said hole, of a tubular reinforcement or socket piece adapted to fit within said hole and within the second-named part or member, the said reinforcement or socket piece having a shoulder conformed to the surface of the first-named part or member and fitting against the same and having its projecting end upset against the wall of said first-named part or member, the second-named part or member having its extremity shaped to fit against said shoulder, substantially as shown and described.

This specification signed and witnessed this 4th day of November, A. D. 1895.

HARRY P. FOWLER.

In presence of—
 WM. BYORKMAN,
 J. S. COPELAND.